Dec. 16, 1924.

S. A. CRONE

RAILWAY BRAKE BEAM

Filed March 22, 1924    2 Sheets-Sheet 1

Seth A. Crone, Inventor

By his Attorney

Dec. 16, 1924. 1,519,763
S. A. CRONE
RAILWAY BRAKE BEAM
Filed March 22, 1924 2 Sheets-Sheet 2
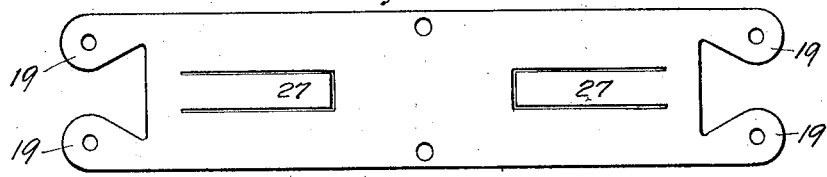
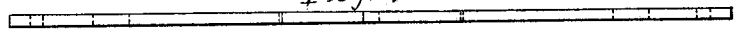
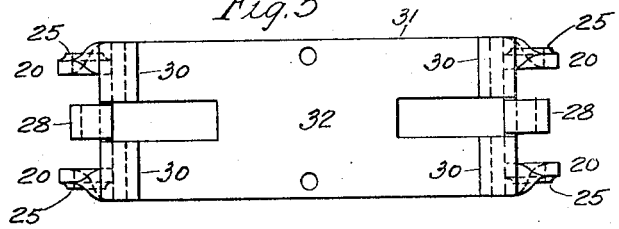
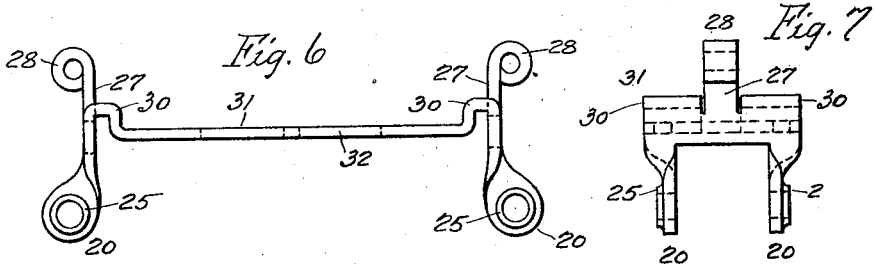
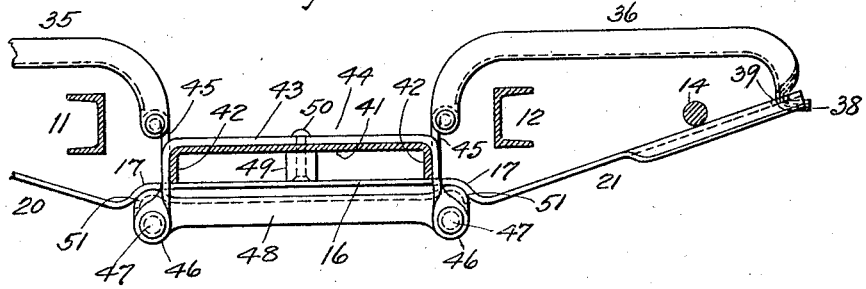
Inventor
Seth A. Crone,
By his Attorney Patented Dec. 16, 1924.

1,519,763

UNITED STATES PATENT OFFICE.

SETH A. CRONE, OF EAST ORANGE, NEW JERSEY.

RAILWAY BRAKE BEAM.

Application filed March 22, 1924. Serial No. 701,010.

*To all whom it may concern:*

Be it known that I, SETH A. CRONE, a citizen of the United States, and a resident of East Orange, in the county of Essex and State of New Jersey, have invented certain new and useful Improvements in Railway Brake Beams, of which the following is a specification.

The invention pertains to railway brake beams and particularly to a four-point suspension therefor and means cooperating with the respective tramway bar members of the four point suspension for holding the beam captive, while at the same time permitting the beam to have its requisite movements in the service application of the brakes to and their release from the car wheels. One feature of the invention consists in the combining with the four point suspension tramway bars, of detachable links of special form extending over said bars and the brake-beams thereon and connected at their outer ends with the outer ends of said bars and at their inner ends with truck parts, for the purpose of preventing in the event of accident to a brake-beam hanger, the end of the beam from slipping over the outer end of the tramway bar and also of preventing on the service application of the brakes, the wheel from causing the brake shoe at the disabled end of the beam to ride unduly upward on the wheel. The ends of the brake-beam are, in accordance with my invention, held captive between the tramway bars and overhead links, and thereby the beam in case of accident to the hangers can neither fall to the roadbed or be carried upwardly over the wheels.

A further feature of the invention resides in special means for detachably securing the tramway bars to the spring plank of the car truck and also to means for connecting the inner ends of the safety guard links with the car truck structure.

I present my invention herein as utilizing certain features shown and described in Letters Patent No. 1,475,280 granted to me on November 27, 1923, but my invention is obviously applicable to the tramway bars of various well known four-point suspension mechanisms. Therefore the essential features of the invention are not limited, in every instance, to all the details of the tramway bars shown in the drawings.

The invention will be fully understood from the detailed description hereinafter presented, reference being had to the accompanying drawings, in which:

Fig. 3 is a plan view of a blank which I transform into a frame to be applied to the spring plank and cooperate with other features in connecting the tramway bars and safety links or guards therewith;

Fig. 4 is an edge view of the same;

Fig. 5 is a plan view of the frame or attachment formed from the blank shown in Fig. 3 ready for application to the spring plank of the truck frame;

Fig. 6 is a side elevation of the same;

Fig. 7 is an end projection of the same, taken from the right hand end of Fig. 6, and Fig. 8 is a view corresponding with Fig. 2, but illustrating a modified form of the attachment for the spring plank arising from the fact that in Fig. 8 the flanges of the spring plank extend downwardly, whereas the flanges of the spring plank shown in Fig. 2 extend upwardly.

Figure 1:
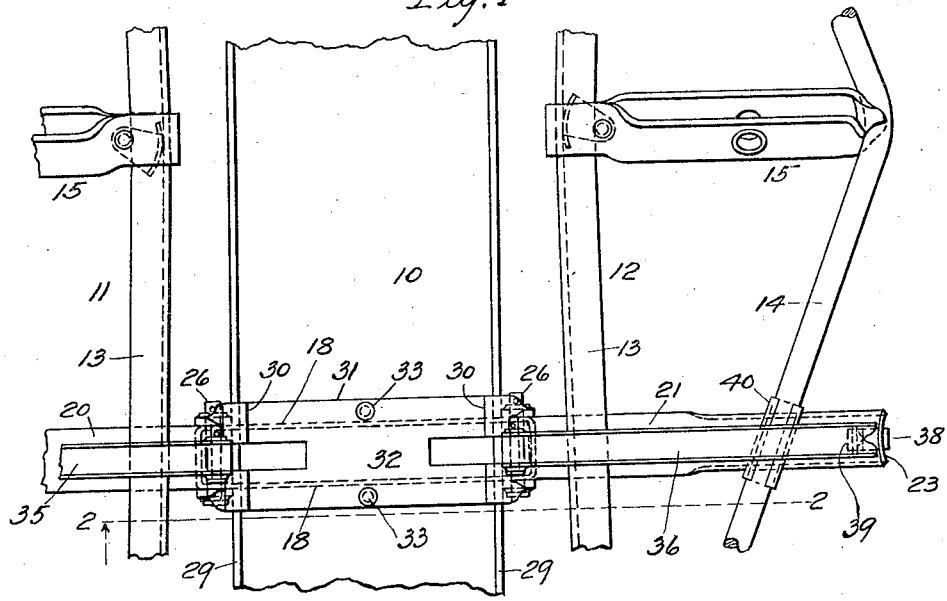
Fig. 1 is a plan view of a broken away portion of a car truck frame equipped with inside hung brake-beams and the four point suspension and safety features of my invention.

In the drawings, referring to Figs. 1 to 7 inclusive, 10 designates a portion of a customary spring plank constituting a portion of a car truck frame, and 11, 12, respectively, denote inside hung trussed brake beams of known form each comprising a compression member 13, a tension member or truss rod 14 and a strut 15 adapted to take the usual brake lever, not shown. On the ends of the beams 11, 12 are usual brake-shoe heads, not shown, carrying brake-shoes for application to the car wheels in the customary way. The beams 11, 12 are suspended by swiveled hangers of usual type, not shown, these hangers representing two points of brake-beam suspension.

I provide, at each side of the truck, tramway bars 20, 21 as means for supporting and guiding the brake beams, and these bars incline upwardly at each side of the spring plank, as usual, and, in the illustration of my invention presented herein, have convexed upper end surfaces, as at 23, to receive the end portions of the truss-rods 14, in the manner and for the purposes described in my aforesaid Letters Patent. I preferably form the tramway bars 20, 21 from one integral bar which I number 16, whose transverse middle portion is flat and detachably secured against the lower surface of the spring plank 10. The middle portion of the bar 16 is flat where it extends across the underside of the spring plank and thence at the front and rear edges of said spring plank, said bar curves downwardly, as at 17, and thence inclines upwardly and outwardly to form a proper support and guide for the truss-rods 14.

Figure 2:
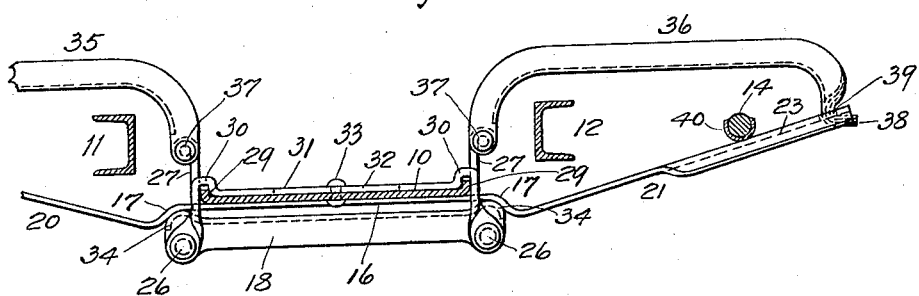
Fig. 2 is a vertical longitudinal section through the same, taken on the dotted line 2—2 of Fig. 1.

The middle portion of the tramway bar 16 is secured in position by means of a frame, such as shown in Fig. 5, and a cam bar 18, and said frame illustrated in Fig. 5 is formed from a flat sheet metal blank illustrated in Figs. 3 and 4, the end portions of the blank being recessed to form members 19 which are finally twisted into parallelism and bent downwardly to form ears 20, these ears being apertured and the metal around the apertures being upset, as at 25, to form firm bearings for bolts or pins 26 (Figs. 1 and 2). The end portions of the blank shown in Fig. 3, inwardly from the end edges of said blank, are slit to form therein integral tongues 27, and these tongues are thereafter bent upwardly and curled over on their upper free ends to form knuckle or hinge members 28, said tongues 27 when bent upwardly constituting standards which extend vertically at the front and rear edges of the spring plank. The middle portion of the blank shown in Fig. 3 is depressed to fit between the flanges 29 of the spring plank, as shown in Fig. 2, and thereby transverse channel members 30 are formed at the end portions of the frame, numbered as a whole 31, to fit upon the aforesaid flanges 29 of the spring plank, the middle portion 32 of the frame 31 being seated on the spring plank, and the upwardly extending arms 27 and depending ears 20 being disposed vertically at the front and rear side edges of the spring plank, as shown in Figs. 1 and 2. The details of the frame 31 are illustrated in Figs. 5, 6 and 7, and this frame formed from the blank shown in Fig. 3 is adapted to be applied directly to the spring plank and to be secured thereto by rivets 33.

The cam bar 18 is of channel shape, by preference, and on its ends is formed with cams 34 which, in the normal position of the bar, engage the curved portions 17 of the tramway bar 16 and press the middle portion of said bar against the under surface of the spring plank 10, said cams 34 operating as clamps for binding the tramway bar 16 against the spring plank. The bar 18 has apertured ends and is secured in position by the pins 26 which pass through said ends and also through the ears 20 of the superposed securing frame 31. The pressure exerted by the cams 34 not only binds the tramway bar 16 against the spring plank, but creates a downward tension on the front and rear edges of the frame 31 tending to bind said frame in position. When the tramway bar 16 is to be applied to position, one of the pins 26 will be removed and the bar 18 will be swung downwardly on the other pin 26, and thereupon the tramway bar may be passed between the lower surface of the spring plank and the then upper end of the bar 18 hanging by a pin 26, and thereafter the free end of the bar 18 will be forced upwardly to position and secured by a pin 26. The bar 18 may be of pressed steel, as shown, and said bar being in one integral piece affords an efficient clamping bar for securing the tramway bar detachably in position. The means for securing the tramway bar 16 in position constitute a portion of my invention, and this portion of my invention is not limited to all the details of the other parts of the mechanism shown.

The tramway bar may be utilized in the usual manner without regard to other features, but I prefer to provide safety guard bars 35, 36 for cooperation with the tramways 20, 21 in holding the brake-beams 11, 12 captive, thereby in the event of accident to the usual brake hangers, preventing the brake beams from either falling to the roadbed or being carried upwardly by the car wheels. The safety guard bars 35, 36 are alike and of channel shape and have inner downwardly curved ends secured to the standards 27 by means of pins 37 which are removable and extend through the inner ends of said guard bars and through the sleeves or knuckle members 28 formed on the upper ends of the standards 27. The guard bars 35, 36 extend outwardly in opposite directions above the tramways 20, 21 and over the brake beams 11, 12, and the outer ends of said guard bars are curved downwardly and condensed to form hook members 38 which enter openings 39 in the ends of the tramways 20, 21. In assembling the guard bars 35, 36, the outer hook-ends of said bars are first inserted downwardly, while the bars are in substantially vertical position, through the openings 39 and thereupon said bars are turned inwardly toward the spring plank and have their inner ends secured to the standards 27 by the pins 37. The guard bars 35, 36 are removable, and when it is desired to remove them, the pins 37 are withdrawn and said bars are turned upwardly so as to facilitate the withdrawal of their hook-ends 38 from the openings 39. The one frame 31 thus serves for the purpose of securing the tramway bar 16 in position and also securing the guard bars 35, 36 in operative relation to said tramways. The truss rods 14 ride on the tramways 20, 21, and I preferably on said rods electrically weld a split sleeve 40 to take the wear of the tramways from the initial truss rods, said sleeves forming a portion however of the truss-rods by being permanently secured thereto.

The operation of the invention will be understood from the foregoing description. The tramways 20, 21 perform their usual duties and so far as these tramways are concerned, the invention resides in the means for securing them in position and their special shape is not of importance so far as the present invention is concerned. The guard bars 35, 36 will cooperate with the tramways 20, 21 regardless of the details of said tramways.

The spring plank 10 shown in Fig. 1 is shallow and of known form, but many spring planks have deeper flanges than the flanges 29 shown in the drawings, and hence the frame 31 in the proportions of its channels 30 will have to conform to the depth of the flanges on the spring planks to which the suspension is to be applied. Some spring planks have their edge flanges turned downwardly instead of upwardly, and in Fig. 8 I illustrate a spring plank of inverted channel type, the spring plank being numbered 41 and its flanges 42. For a spring plank of this form there will be no change in the tramway bar 16, tramways 20, 21 or safety guard bars 35, 36, but the middle portion of the frame 31 must be looped upwardly, as at 43 in Fig. 8, to engage the flat upper surface of the spring plank 41. The setting upwardly of the middle portion 43 of the securing frame 31 causes the channel portions 30 of said frame to disappear, and in view of the construction shown in Fig. 8 being a modification, I number the frame 44 to distinguish the same from the frame 31. Aside from the upward setting of the middle portion 43 of the frame 44 to meet the inverted situation of the spring plank 41, the frame 44 performs all the duties of the frame 31, it being formed with standards 45 to receive the inner ends of the safety guard bars 35, 36 and depending arms or ears 46 to receive the pins 47 for securing the cam bar 48 in place against the curved portions 17 of the tramway bar 16. In view of the inversion of the spring plank the middle portion of the bar 16 will bear against the edges of the flanges 42 of the spring plank and against a filler 49 which I will secure to the spring plank by rivets 50, corresponding with the aforesaid rivets 33 and securing the frame 44 to the spring plank. The bar 48 has cams 51 corresponding with the cams 34 shown in Fig. 2. I present Fig. 8 to indicate that the clamping frame for securing the tramway bar 16 to the spring plank is subject to modification to meet the conditions of changes in the form and construction of spring planks.

What I claim as my invention and desire to secure by Letters-Patent, is:

1. In a car-truck having a spring plank and a trussed brake-beam, a tramway suspension bar for the beam extending below the spring plank, and means for detachably securing said bar against said plank comprising a frame extending across the upper side of said plank and having arms extending downwardly at opposite edges of said plank and a clamping bar below said frame, plank and tramway bar and secured at its ends to said arms, said bar being pivotally secured at one end and detachably secured at the other end and having cams at its ends to bind upwardly against the tramway bar.

2. In a car-truck having a spring plank and a trussed brake-beam, a tramway suspension bar for the beam extending below the spring plank, and means for detachably securing said bar against said plank comprising a frame extending across the upper side of said plank and having at its ends parallel arms extending downwardly at opposite edges of said plank and a clamping bar below said frame, plank and tramway bar and pinned at its ends between the pairs of said arm, said bar being pivotally secured at one end and detachably secured at the other end and having cams at its ends to bind upwardly against the tramway bar.

3. In a car-truck having a spring plank and a trussed brake-beam, a tramway suspension bar for said beam extending below the spring plank, and means for detachably securing said bar against said plank comprising rigid arms extending downwardly at opposite edges of said plank and a clamping bar crossing the lower side of the plank below the tramway bar secured at its ends to said arms, said bar being pivotally secured at one end and detachably secured at the other end and having cams at its ends to bind upwardly against the tramway bar.

4. In a car-truck having a spring plank and a trussed brake-beam, a tramway suspension bar for said beam extending below the spring plank, and means for detachably securing said bar against said plank comprising rigid arms extending downwardly in pairs at opposite edges of said plank and a clamping bar crossing the lower side of the plank below the tramway bar and secured at its ends between said arms, said clamping bar being pivotally secured at one end and detachably secured at the other end and having cams at its ends to bind upwardly against the tramway bar.

5. In a car-truck having a spring plank and a trussed brake-beam, a tramway suspension bar for the beam, extending below the spring plank, and means for detachably securing said bar against said plank comprising a frame extending across the upper side of said plank and having arms extending downwardly at opposite edges of said plank and a clamping bar below said frame, plank and tramway bar and secured at its ends to said arms, said bar being pivotally secured at one end and detachably secured at the other end and having cams at its ends to bind upwardly against the tramway bar, and said frame in its upper part being a plate depressed to engage the top face of the spring plank and at its ends being engaged with the flanges of said plank.

6. In a car-truck having a spring plank and inside hung trussed brake-beams, tramway suspension bars for said beams, a frame crossing the spring plank and secured thereto and having integrally with its front and rear edges vertical standards, and safety guard bars secured at their inner ends to said standards and at their outer ends to the outer ends of said tramway bars.

7. In a car-truck having a spring plank and inside hung trussed brake-beams, a tramway suspension bar whose transverse middle portion is against the lower surface of said spring plank and whose end portions incline upwardly and outwardly to form tramways for said beams, and means for detachably securing said bar against said plank comprising rigid arms extending downwardly at opposite edges of said plank and a clamping bar crossing the lower side of the plank below the tramway bar and secured at its ends to said arms, said bar being pivotally secured at one end and detachably secured at the other end and having cams at its ends to bind upwardly against the tramway bar.

8. In a car-truck having a spring plank and inside hung trussed brake-beams, tramway suspension bars for said beams, a frame crossing the spring plank and secured thereto and having integrally with its front and rear edges vertical standards, and safety guard bars detachably secured at their inner ends to said standards and at their outer ends to the outer ends of said tramway bars.

9. In a car-truck having a spring plank and inside hung trussed brake-beams, a tramway suspension bar whose transverse middle portion is below the spring plank and whose end portions incline upwardly and outwardly to form tramways for said beams, means for detachably securing said bar against the plank comprising a frame crossing and engaging the top of the plank and having end arms which extend upwardly to form standards and arms which extend downwardly below the plank and a clamping bar below said plank and suspension bar and secured to said downwardly extending arms and at its ends having cams to bind upwardly against the tramway bar, and safety guard bars secured at their inner ends to said standards and at their outer ends to the outer ends of said tramways.

Signed at New York city, in the county of New York and State of New York, this 21st day of March, A. D. 1924.

SETH A. CRONE.